Dec. 4, 1962 A. E. CHOATE ETAL 3,066,421
HELIX TESTER
Filed Dec. 4, 1957 2 Sheets-Sheet 1
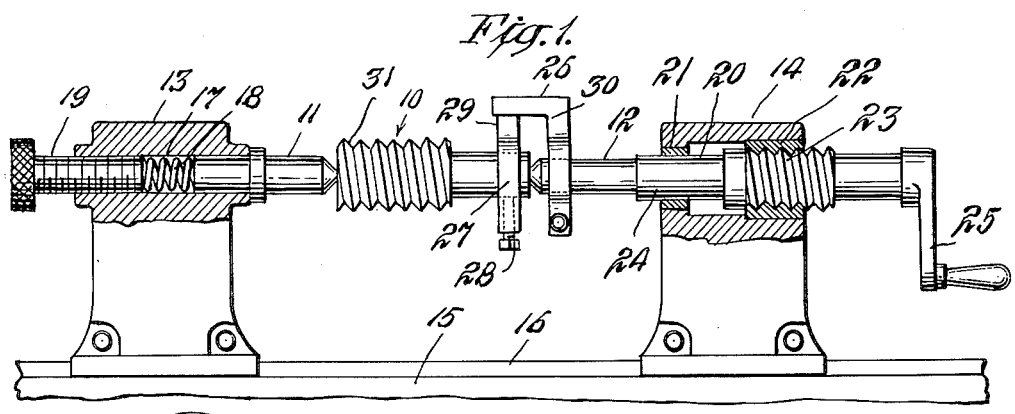
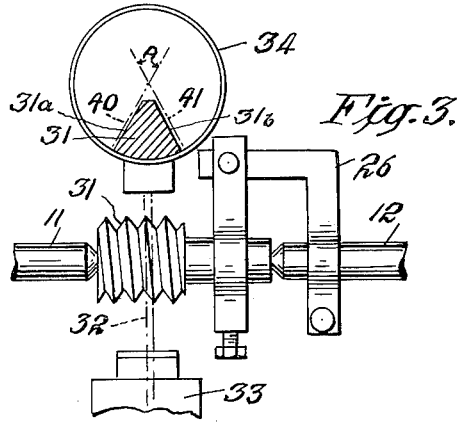
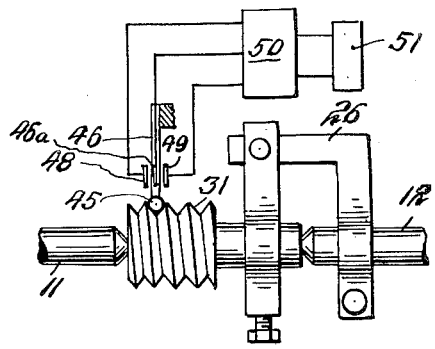
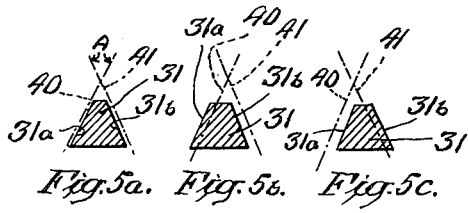
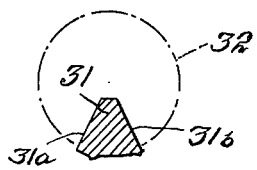
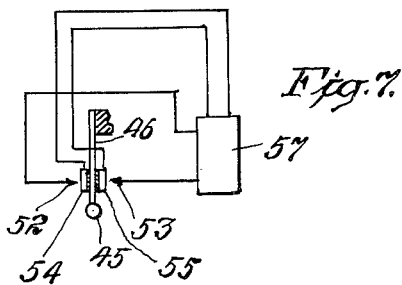
INVENTORS
ARTHUR E. CHOATE
CHARLES J. SULLIVAN
BY Frank A. Bauer
ATTORNEY Dec. 4, 1962 A. E. CHOATE ETAL 3,066,421
HELIX TESTER
Filed Dec. 4, 1957 2 Sheets-Sheet 2
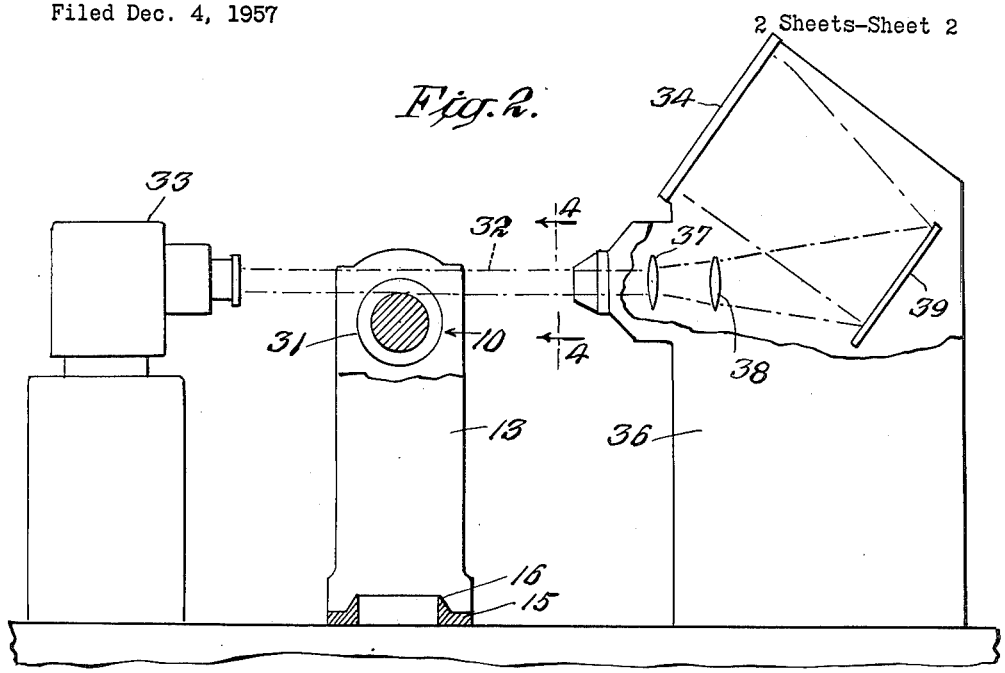
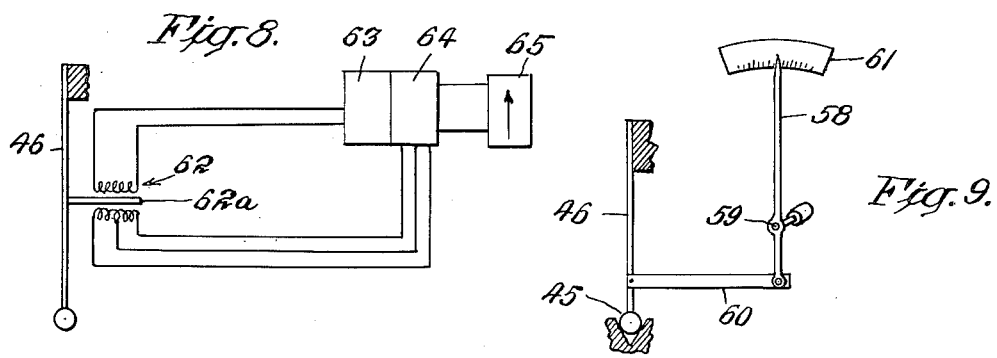
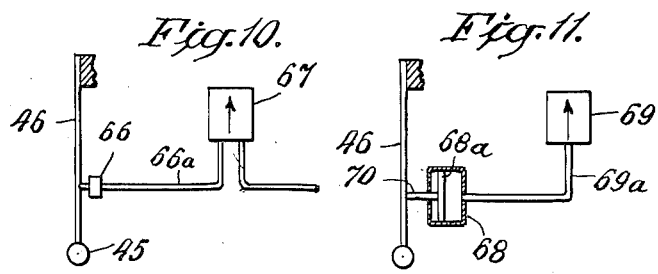
INVENTORS
ARTHUR E. CHOATE
CHARLES J. SULLIVAN
BY Frank A. Bower
ATTORNEY 3,066,421
HELIX TESTER
Arthur E. Choate, 26 Shattuck St., and Charles J. Sullivan, 46 Ferrante Ave., both of Greenfield, Mass.
Filed Dec. 4, 1957, Ser. No. 700,701
1 Claim. (Cl. 33—199)

This invention relates to an apparatus for testing the precision of the formation of screw threads, and is directed particularly to the incremental measurement of the deviation of the thread flanks from the true helix of the screw thread.

In the manufacture of screw threads for plug or ring gages the advance of the helix of the thread should be constant for each portion of the thread. A deviation in the advance of the flank surfaces of the thread from a true helix will cause the effective or apparent pitch diameter of the thread to change. In the case of a thread plug working or setting gage it will result in a larger effective diameter on the threads of the gage. Such gages may pass a threaded hole that is too large or reject an acceptable threaded hole as being too small, depending on the type of gage involved.

In testing a product with a go plug gage, if deviations in the helix advance are present, the gage would not enter a threaded hole with as small a pitch diameter as a gage with a true helix advance since the gage with deviations from the true helix would have a larger effective pitch diameter. Therefore, a gage with deviations from the true helix could reject a product which a gage without deviations from the true helix would accept. In testing a product with a not go plug gage, if deviations from the true helix are present they would result in a larger effective pitch diameter and the thread gage could pass a product that a gage with no deviations from the true helix would reject. Thread ring gages set with plug thread gages will be incorrectly set if the plug thread gage has deviations from the true helix that increase the effective pitch diameter. A go thread ring gage set with a thread plug gage that has deviations from the true helix resulting in a larger effective pitch diameter could pass a product which is beyond the maximum limit. A not go thread ring set with a thread plug gage that has deviations from the true helix resulting in a larger effective pitch diameter could reject a product that a thread ring gage set with a thread plug gage with a true helix would pass.

The uniformity in the advance of the helix may be checked by measuring the lead wtih conventional lead checking instruments which measure the distance of advance over a number of threads. However, in the case of a deviation having a repetitious pattern which varies from a plus to a minus deviation from the true helix, the lead measured over a number of threads may be accurate while the advance of the helix of the thread may be inaccurate over sectors of a particular thread. Such inaccuracies will cause the gage to incorrectly test a threaded product as previously described. A helix or thread with this type of deviation is referred to as a "drunken helix" and is produced primarily in the precision grinding of the flank surfaces of the threads. This deviation can be reduced to within allowable limits for gages by a subsequent ring lapping of the gage after the grinding of the threads.

An object of this invention is to provide a testing apparatus that will disclose any deviation of the thread gage helix from a true helical path.

A further object of this invention is to provide an apparatus that permits a continuous measurement of the entire length of the thread to determine whether the gage helix is within the permissible tolerance.

In the following description, testing apparatuses are disclosed which measure the deviation of the helical surfaces from the true helical path.

The apparatus is described in the drawings, in which:

FIG. 1 illustrates the apparatus for rotatably supporting the gage;

FIG. 2 illustrates a sectional view of the apparatus for measuring the helical surfaces of the thread;

FIG. 3 illustrates a fragmentary top view of the measuring apparatus;

FIG. 4 illustrates a sectional view along line 4—4 of FIG. 2;

FIGS. 5a–5c illustrate a projection of the threads on a measuring screen by the apparatus shown in FIG. 2; and FIGS. 6–11 illustrate various embodiments with a probe in contact with the thread.

The plug gage 10 is rotatably supported between spindles 11 and 12 to rotate about the longitudinal axis of the gage. The spindle 11 is slidably mounted in the stock 13. The spindle 12 is slidably and rotatably mounted in the stock 14. The stocks 13 and 14 are slidably mounted on the base 15 with rails 16 for guiding the movement of the stocks 13 and 14 in the usual manner. The stocks 13 and 14 may be moved in relation to one another to adapt the apparatus for various size gages to be measured. They are securely fastened in place by suitable dogs or fastening means, not shown.

The spindle 11 is mounted in the bore 17 in the stock 13 and is resiliently forced into engagement with the plug gage 10 by means of the helical spring 18 and the adjusting screw 19 threaded in the stock 13. The spindle 12 is securely mounted in the shaft 20 which is rotatably and slidably mounted in the stock 14 by means of the bearings 21 and 22. The shaft 20 has a threaded portion 23 and a smooth cylindrical portion 24. The threaded portion 23 and the threads of the bearing 22 are accurately formed so that the spindle 12 and the shaft 20 have a true lead over the entire axial movement. The threaded portion 23 (master lead screw) and the threaded bearing 22 (master lead nut) are changeable to conform with the lead of the gage being tested. The thread 23 and the thread of the gage have the same pitch so that the gage thread follows a true helical path. Any deviation from the true helix is reflected by a change in the position of the thread.

The plug gage 10 is rotated by the spindle 12 by means of the coupling means 26. The coupling means 26 comprises a collar 27 secured to the shaft of the plug gage 10 by the set screw 28 and has a projection 29 engaged by the dog 30 securely fastened to the spindle 12. Thus, as the crank 25 is rotated, the plug gage 10 is rotated and axially moved. When the crank 25 is rotated to move towards the stock 13, the spindle 11 is forced against the spring 18. When the crank 25 is rotated to move away from the stock 13, the spring 18 moves the plug gage 10 in the opposite direction. Thus, the gage may be rotated in either direction.

Thus, the thread 31 of the plug gage 10 is moved axially in uniform increments of axial rotation. Therefore, the leading and lagging surfaces 31a and 31b will not shift axially if the leading and lagging surfaces are true helices. In order to determine whether the surfaces follow a true helix, a light beam 32 is provided. The light beam is produced by the projector 33 which forms focused parallel rays and projects the beam so that it is perpendicular to the helical axis of the thread plug gage. The beam engages the thead of the gage so that a sharp silhouette of the gage is formed of at least one turn as illustrated in FIG. 4.

This sharp silhouette may be projected upon a screen 34 as illustrated in FIGS. 5a–5c. As illustrated in FIGS.

2 and 3, the beam with the silhouette is received by a projector or illuminating means 36 which has magnification lenses 37 and 38 for increasing the size of the silhouette and projecting it upon the screen 34 by means of a reflector 39. The screen 34 may be provided with lines 40 and 41 which are at an angle A corresponding to the angle of the surfaces of the thread. If the thread 31 is formed with true helical surfaces 31a and 31b, the shadow of the thread as the plug gage is rotated by the crank 25 will remain between the lines 40 and 41. However, if there is a deviation from the true helical surface, the shadow of the thread 31 will shift to the right or left, depending upon whether there is a plus or minus deviation. Thus, there is clearly indicated on the screen 34 a deviation from a true helix. The plug gage may then be removed and ring-lapped, and then reinserted into the testing apparatus to determine whether the variation has been reduced to the permissible tolerance.

In FIGS. 6-11 another embodiment of the invention is shown in which a rod 45 is supported in engagement between the threads by means of a flexible arm 46. The threads 31 are rotated and moved axially while the rod 45 remains in position. If there is a variation in the lead or helical surface of the thread, the rod 45 will shift in its position to bend the arm 46. The deviation of the arm 46 may be electrically determined by the capacitive probes 48 and 49 on opposite sides of the arm 46. The capacitive probes 48 and 49 are connected to a detection circuit 50 which operates a signalling apparatus indicated at 51. Thus, the operator is informed that the thread has a deviation beyond the permissible tolerance. In FIG. 7, contacts 52 and 53 are provided on opposite sides of the arm 46. When the arm 46 is bent by deviation of the thread, the buttons 54 or 55 are brought into contact with the contacts 42 and 53 to pass an electric current which initiates a signal in the signalling unit 57.

In FIG. 8, the arm 46 is fastened to a suitable electrical transducer, such as a variable transformer 62. The transformer 62 has a variable core 62a fastened to the arm or probe 46 and shifts in position on occurrence of a deviation from the true helix. This shift varies the inductance of the transformer. A power supply 63, an amplifier 64 and a suitable meter 65 are provided and connected to the variable transformer to measure the variation in inductance, which is proportional to the deviation of the helix, and to indicate this deviation on the meter 65. Thus, the meter 65 indicates whether or not the screw thread is within the allowable tolerance.

The deviation may also be indicated mechanically, instead of by electrical means. In FIG. 9 a pointer 58 is pivotally mounted at 59 and pivotally connected by a hinge 60 to the arm 46. A deviation of the rod 45 in either direction will move the pointer 58 along the scale 61 which will indicate a deviation within or beyond the permissible tolerance.

In FIG. 10, a suitable air gage 67 has an actuator 66 mounted against the arm 46 and connected to the gage by a tube 66a. Deviations in the helix advance of the thread are recorded on the meter of the air gage 67, indicating whether or not the product is within tolerance.

In FIG. 11 the arm 46 is attached by suitable means, such as the arm 70, to the diaphragm or piston 68a of a suitable hydraulic cylinder 68. A meter 69 is connected to the cylinder by the line 69a. Any deviations in the helix advance of the thread are thereby recorded on the meter indicating whether or not the product is within tolerance. The pressure of the variation shifts the piston 68a to vary the pressure on the hydraulic system.

The embodiment illustrated and described in connection with FIGS. 6-11 may be utilized to measure the deviation of ring gages as well as plug gages. The probe may be inserted within the gage to bear against the flanks of the threads so that a change in the advance of the helix of the thread of the ring gage will produce a movement of the probe and thereby actuate the mechanical or electrical device associated therewith when the deviation is greater than the permissible tolerance.

Various other modifications may be made to indicate the deviation of the surfaces of the thread from a true helix.

We claim:

Apparatus for testing the helix of a thread comprising a base, a first stock and a second stock, said first stock having a precision threaded portion free of deviations from a true helix and a shaft mounted therein with a complementary precision threaded portion free of deviations from a true helix to uniformly move said shaft axially on rotation, a first spindle mounted on said shaft to rotate therewith, a second spindle slidably mounted in said second stock with a resilient member to press against said second spindle and urge said spindle toward said first stock for holding a member having a thread corresponding to said precision threaded portion of said first stock, means for rotating a member held between said spindles with rotation of said first spindle, a bearing in said first stock between said threaded portion and said member for precisely supporting said first spindle axially in alignment with said second spindle, illuminating means for producing a beam of light focused to impinge on at least one turn of a threaded member held between said spindles, a screen for receiving said beam to produce a silhouette of the turn thereon, means on the screen indicating the standard slope and lead position of the flanks of a thread corresponding to the thread of the threaded member and the precision threaded portion of said first stock for comparing a silhouette of the turn of the threaded member with the standard slope and lead to detect deviations of the thread of the threaded member from a true helix.

References Cited in the file of this patent

UNITED STATES PATENTS

| | | |
|---|---|---|
| 931,475 | Picard | Aug. 17, 1909 |
| 1,480,390 | Hartness | Jan. 8, 1924 |
| 1,766,800 | Peterson et al. | June 24, 1930 |
| 1,904,130 | Garms et al. | Apr. 18, 1933 |
| 1,968,866 | Ames | Aug. 7, 1934 |
| 2,066,999 | Neufield | Jan. 5, 1937 |
| 2,122,664 | Terry | July 5, 1938 |
| 2,375,600 | Wattebot | May 8, 1945 |
| 2,387,496 | Cornelius | Oct. 23, 1945 |
| 2,763,068 | Starbuck | Sept. 18, 1956 |
| 2,829,442 | Peickii | Apr. 8, 1958 |